Aug. 2, 1966 W. B. CONRAD 3,263,949
SCREW RETAINING FITTING FOR A REMOTE CONTROL ASSEMBLY
Filed May 17, 1965
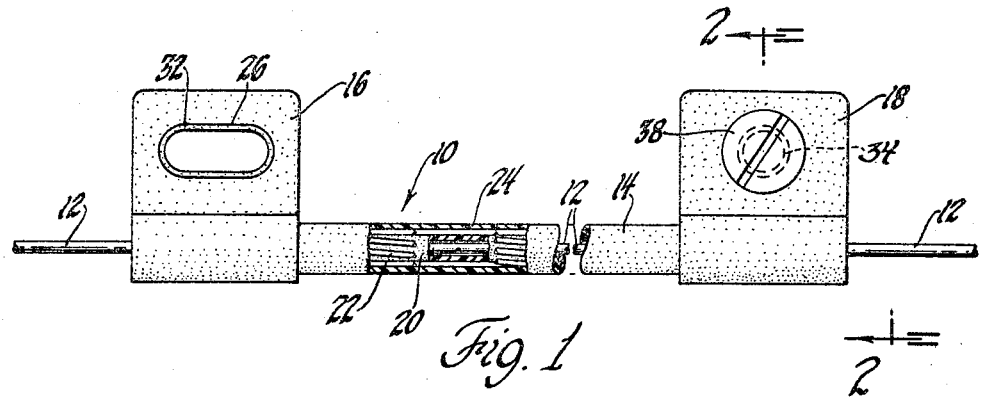
Fig. 1
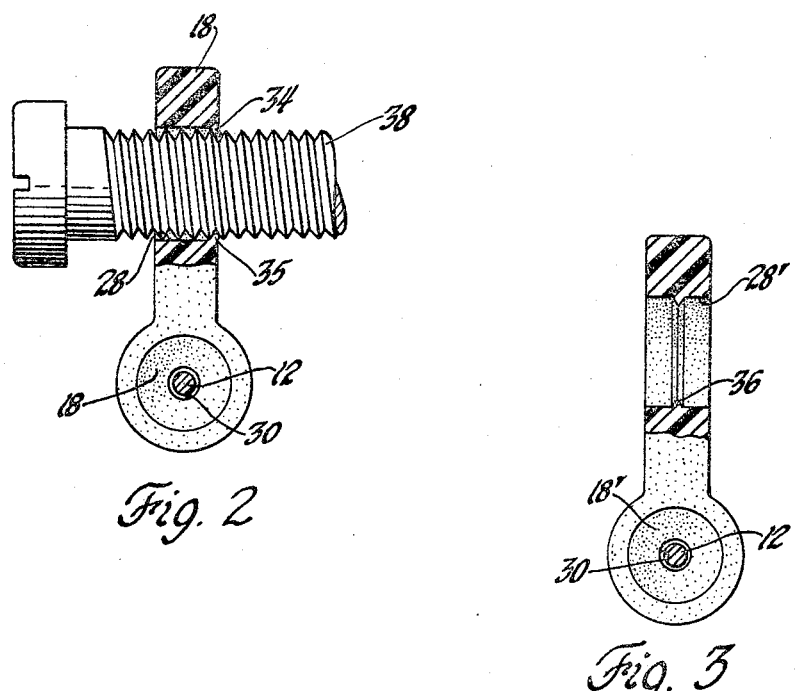
Fig. 2
Fig. 3
INVENTOR.
Winthrop B. Conrad
BY
Barnard, McGlynn & Reising
ATTORNEYS United States Patent Office 3,263,949
Patented August 2, 1966

3,263,949
SCREW RETAINING FITTING FOR A REMOTE CONTROL ASSEMBLY
Winthrop B. Conrad, Franklin, Mich., assignor to Teleflex Incorporated, North Wales, Pa., a corporation of Delaware
Filed May 17, 1965, Ser. No. 456,182
32 Claims. (Cl. 248—74)

This invention relates to a remote control assembly and, more particularly, to a fitting suitable for use in such a remote control assembly to secure the assembly to a support structure and wherein the fitting has at least one hole therethrough and an endless flexible membranous rib formed integrally with the fitting and disposed in the hole for retaining a threaded member in the hole and for bending or flexing to allow the threaded member to move relative to the fitting as it is rotated for threaded engagement with the support structure.

Remote control assemblies of the type with which the instant invention is particularly applicable typically include a conduit which movably supports a motion transmitting core element and fittings secured to the conduit and adapted to be attached to a support structure. The motion transmitting core element may be of the rotary type or of the push-pull type. Such remote control assemblies are, therefore, assembled by securing one or more fittings to a conduit and disposing a motion transmitting core element within the conduit. After the remote control assembly is fabricated, it is shipped to a user to be installed in an aircraft, marine vehicle, automobile, or other equipment. Such remote control assemblies are frequently utilized as push-pull control assemblies in automobiles for positioning vents or controlling heaters, and the like. Normally, one end of the remote control assembly is attached in the dashboard or instrument panel area of the automobile while the other end is disposed adjacent the particular element to be controlled, such as a vent. Frequently, the position where the conduit of the remote control assembly is to be secured to the vehicle by the fitting is very inaccessible and difficult to reach. For example, when a remote control assembly having a fitting attached to the conduit adjacent one end thereof such that a screw may be inserted through a hole in the fitting to secure the fitting to the body of an automobile above and behind the instrument panel, it is frequently very difficult to hold the fitting in the proper position so that a screw may be inserted through the hole in the fitting and turned into threaded engagement with the automobile body at the particular position. Needless to say, it frequently occurs that the screw which is to be placed through the hole in the fitting to secure the fitting to the automobile body is dropped such that it must be picked up or replaced by another screw and the process of positioning the end fitting and placing the screw through the hole in the end fitting to turn the screw into threaded engagement with the automobile body must begin over again. Therefore, the fact that a threaded means, such as a screw or bolt, must be placed through a hole in an end fitting and held there until rotated into threaded engagement with a support structure frequently makes the securement of such an end fitting very cumbersome and time consuming.

It is, therefore, an object and feature of this invention to provide a fitting of the type for securing a conduit to a support structure wherein the fitting has flexible means to secure a threaded member in the fitting during transportation and storage of the fitting but bends to allow the threaded member to move relative to the fitting so that the fitting may be secured to a support structure.

Another object and feature of this invention is to provide a remote control assembly including a flexible conduit and at least one plastic fitting secured to the conduit, which fitting has at least one hole therethrough and a flexible membranous rib formed integrally therewith and disposed in the hole to retain a threaded means in the hole and for flexing so that the threaded means is allowed to move through the hole when rotated to attach the fitting to a support structure.

In general, these and other objects and features of the present invention may be attained by a plastic fitting adapted for supporting a conduit and having at least one hole therethrough with an endless flexible membranous rib integral with the fitting and disposed within the hole. A threaded means, such as a screw or bolt, may be retained in the hole by the flexible membranous rib during transportation and storage of the fitting but when the fitting is placed in position for attachment to a support structure the threaded means may be rotated into threaded engagement with the support structure since the flexible membranous rib bends or flexes to allow the threaded means to move through the hole.

Other objects and attendant advantages of the instant invention will be readily appreciated as the same becomes better understood by reference to the following detailed description when considered in connection with the accompanying drawings wherein:

FIGURE 1 is a fragmentary plan view partly in cross section of a remote control assembly utilizing a fitting constructed in accordance with the instant invention;

FIGURE 2 is an enlarged cross-sectional view taken substantially along line 2—2 of FIGURE 1 and shows a threaded bolt in phantom; and FIGURE 3 is an enlarged cross-sectional view similar to FIGURE 2 but showing an alternative embodiment of the fitting of the instant invention.

Referring now to the drawings, wherein like reference numerals indicate like or corresponding parts throughout the several views, there is shown, generally at 10, a remote control assembly including a motion transmitting core element 12 movably supported in a conduit 14 and end fittings 16 and 18 secured to the conduit 14 for supporting the conduit 14.

The motion transmitting core element 12 is usually adapted at one end (not shown) to be connected to an element to be controlled and has means attached at the other end for manual actuation thereof to either rotate the core element 12 or to slide the core element 12 within the conduit 14 to perform a remote control function.

The conduit 14 may be any one of various configurations, however, it preferably includes an inner tubular member 20 with a plurality of filaments 22 helically wrapped about the tubular member 20 with a relatively long lead and a casing 24 surrounding the filaments 22. The inner tubular member 20 is preferably made of an organic polymeric material and the filaments 22 may be made of metal wire, plastic, fiberglass, or the like. The outer casing 24 is made of an organic polymeric material, preferably polyethylene or polypropylene.

The fittings 16 and 18 are made of a plastic or organic polymeric material and are secured to the conduit 14 by a mechanical interlock or by being molded to the jacket 24 of the conduit so as to form a chemical bond therebetween. The fittings 16 and 18 are preferably made of an acetal resin, Delrin or nylon since such materials have sufficient compressive strength characteristics so that a screw, bolt, or the like may be inserted through the hole 26 in the fitting 16, the hole 28 in the fitting 18, or the hole 28' in the fitting 18' to secure the respective fittings to a support structure without deforming the respective fittings.

The fittings may have various configured holes therethrough, such as the oval hole 26 in the fitting 16 or the circular hole 28 in the fitting 18. Also, the fittings, as illustrated by the fitting 18 in FIGURE 2 and the fitting 18' of FIGURE 3, are formed so as to cover the end of the conduit 14 and have an aperture 30 therein for the motion transmitting core element 12 to pass therethrough.

Each of the respective end fittings 16, 18, and 18' includes a bendable or flexible means to secure or retain a threaded means, such as a screw or bolt, to the fitting, which means takes the form of an endless flexible membranous rib, as illustrated by the rib 32 of the fitting 16, the rib 34 of the fitting 18, and the rib 36 of the fitting 18'. The endless flexible membranous ribs 32, 34 and 36 are formed integrally with the respective fittings 16, 18 and 18' and are respectively disposed in the hole 26 of the fitting 16, hole 28 of fitting 18, and the hole 28' of fitting 18'.

As is illustrated in FIGURE 2, a threaded means, such as the bolt 38, is retained in the hole 28 by the flexible membranous rib 34. The flexible or bendable membranous ribs 32 and 34 may be disposed adjacent one face of the fittings 16 or 18 respectively or may be disposed at any other position, as is illustrated by the membranous rib 36 which is located midway along the length of the hole 28'.

The bolt 38 may be inserted into the holes 36, 28 or 28' of the respective fittings 16, 18 or 18' and is retained there by one of the flexible membranous ribs 26, 28 or 36 respectively. The flexible membranous rib is a thin resilient rib formed integrally with the respective fitting such that it flexes or bends as the bolt 38 is inserted into the hole and provides sufficient frictional force on the bolt 38 to retain the bolt 38 in the hole.

The membranous ribs 32, 34 and 36 respectively are illustrated as endless flexible ribs and, as is shown at 35 in FIGURE 2, a portion of the rib is moved and/or compressed by a bolt thread which must cross the rib 34 when the bolt 38 is disposed in the circular hole 28.

When the fitting is positioned such that the bolt is rotated to be threadedly engaged with a support structure, the membranous rib 34, like the membranous ribs 32 and 36, flexes or bends so as to allow the bolt 38 to move through the hole 28 as it is threadedly engaged with the support structure to attach the fitting 18 to the support strucure. The membranous ribs 32, 34 and 36 in some instances might be torn or separated at least along a portion thereof from the respective fittings as the bolt 38 is moved into threaded engagement with the support structure. The membranous ribs 32, 34 and 36, therefore, alleviate the need for a screw to be manually retained in the hole in the fitting when the fitting is positioned to be attached to a support structure and consequently also alleviates the problem of the screws or bolts dropping such that they must be picked up or replaced with another screw, which problem is particularly acute when the end fittings are to be secured to inaccessible positions.

Although the end fittings 16, 18 and 18' have been illustrated as those of the type having a flange with one hole therethrough, it will be evident to those of ordinary skill in the art that the instant invention is applicable to various other forms of fittings having one or more holes therethrough for attachment to a support structure. For example, another configuration of a fitting with which the instant invention is particularly applicable is disclosed in the United States patent application Serial No. 424,333, filed January 8, 1965, in the name of Winthrop B. Conrad and assigned to the assignee of the instant invention. Furthermore, the hole in the fitting may be in the form of a slot.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A plastic member of the type secured to another member by threaded fastening means, and the like, said member having at least one hole threthrough, and a flexible membranous rib formed integrally with said member and disposed in said hole.

2. A plastic fitting of the type for securing a member to a support structure, said fitting having at least one hole therethrough, and a flexible membranous rib disposed in said hole for retaining a threaded means in said hole and for flexing to allow said threaded means to move through said hole when rotated to attach said fitting to a support structure.

3. A fitting adapted for supporting a member, said fitting having at least one hole therethrough, and an endless flexible membranous rib disposed in said hole whereby a threaded means may be retained in said hole by said flexible membranous rib and whereby said flexible membranous rib allows such threaded means to move through said hole as the threaded means is rotated to attach said fitting to a support structure.

4. A plastic fitting adapted for supporting a conduit, said fitting having at least one hole therethrough, an endless flexible membranous rib disposed within said hole, and threaded means retained in said hole by said flexible membranous rib, said flexible membranous rib being flexible to allow said threaded means to move through said hole as said threaded means is rotated to attach said fitting to a support structure.

5. A remote control assembly comprising; a conduit, a plastic fitting secured to said conduit for supporting said conduit, said fitting having at least one hole therethrough, and a flexible membranous rib disposed in said hole for retaining a fastener means in said hole.

6. A remote control assembly comprising; a conduit, a motion transmitting core element movably supported in said conduit, a plastic fitting secured to said conduit for supporting said conduit, said fitting having at least one hole therethrough, and an endless flexible membranous rib integral with said fitting and disposed in said hole whereby a threaded means may be retained in said hole by said flexible membranous rib and whereby said flexible membranous rib flexes to allow such a threaded means to move through said hole as the threaded means is rotated to attach said fitting to a support structure.

7. A remote control assembly comprising; a conduit, a motion transmitting core element movably supported in said conduit, a plastic fitting secured to said conduit for supporting said conduit, said fitting having at least one hole therethrough, an endless flexible membranous rib disposed within said hole, and a threaded means retained in said hole by said flexible membranous rib, said flexible membranous rib being flexible to allow said threaded means to move through said hole as said threaded means is rotated to attach said fitting to a support structure.

8. A remote control assembly comprising: a flexible conduit including, an inner tubular member, a plurality of filaments helically wrapped with a relatively long lead about said inner tubular member, a casing disposed about said filaments and said inner tubular member; a plastic fitting secured to said conduit for supporting said conduit; said fitting having at least one hole therethrough; an endless flexible membranous rib disposed within said hole; and a threaded means retained in said hole by said flexible membranous rib, said flexible membranous rib being flexible to allow said threaded means to move through said hole as said threaded means is rotated to attach said fitting to a support structure.

9. A plastic member of the type secured to another member by threaded fastening means, and the like, said plastic member having a hole therethrough to receive the fastening means, and a flexible membranous rib secured to said plastic member in substantial axial alignment with said hole.

10. A plastic fitting of the type for securing a member to a support structure, said fitting having a hole therethrough, and a flexible membranous rib secured to said fitting in substantial axial alignment with said hole to retain a threaded means in said hole and for flexing to allow said threaded means to move through said hole to attach said fitting to a support structure.

11. The plastic fitting as defined in claim 10 in which said rib is annularly endless.

12. A first member to be secured to a second member by fastener means, said first member including means defining an aperture extending therethrough to receive the fastener means, and an axially resiliently flexible retaining means secured to said first member in substantial axial alignment with said aperture therein, said retaining means being axially resiliently flexible to receive and retain the fastener means in preassembled relation to said first member in response to axial movement of the fastener means relative to said retaining means and said aperture prior to securing said first member to said second member.

13. A first member to be secured to a second member by threaded male fastener means, said first member including means defining an aperture extending therethrough to receive the fastener means, and an axially resiliently flexible retaining means secured to said first member in substantial axial alignment with said aperture therein, said retaining means being axially resiliently flexible to receive and retain the fastener means in preassembled relation to said first member in response to axial movement of the fastener means relative to said retaining means and said aperture prior to securing said first member to said second member.

14. The invention as defined in claim 13, wherein said first member is made of plastic, and said retaining means is formed integrally therewith.

15. The invention as defined in claim 13 in which said retaining means is disposed within said aperture.

16. The invention as defined in claim 15 wherein said retaining means comprises an annularly endless membranous rib.

17. The invention as defined in claim 16 wherein said first member is made of plastic, and said rib is formed integrally therewith.

18. The invention as defined in claim 13 further including a male threaded fastener means retained in preassembled relation in said retaining means and aperture.

19. A fitting for securing a member to a support structure, said fitting including means defining an aperture extending therethrough to receive a fastener means, and an axially resiliently flexible retaining means secured to said fitting in substantial axial alignment with said aperture therein, said retaining means being axially resiliently flexible to receive and retain the fastener means in preassembled relation to said fitting in response to axial movement of the fastener means relative to said retaining means and said aperture prior to securing the member to the support structure.

20. A fitting for securing a member to a support structure, said fitting including means defining an aperture extending therethrough to receive a male threaded fastener means, and an axially resiliently flexible retaining means secured to said fitting in substantial axial alignment with said aperture therein, said retaining means being axially resiliently flexible to receive and retain the fastener means in preassembled relation to said fitting in response to solely axial movement of the fastener means relative to said retaining means and said aperture prior to securing said fitting to the support structure.

21. The invention as defined in claim 20 wherein said fitting is made of plastic, and said retaining means is formed integrally therewith.

22. The invention as defined in claim 20 in which said retaining means is disposed within said aperture.

23. The invention as defined in claim 22 wherein said retaining means comprises an annularly endless membranous rib.

24. The invention as defined in claim 23 wherein said fitting is made of plastic, and said rib is formed integrally therewith.

25. The invention as defined in claim 20 further including a male threaded fastener means retained in preassembled relation in said retaining means and aperture.

26. A remote control assembly comprising a conduit, a fitting secured to said conduit for mounting the latter to a support structure, said fitting including means defining an aperture extending therethrough to receive a fastener means, and an axially resiliently flexible retaining means secured to said fitting in substantial axial alignment with said aperture therein, said retaining means being axially resiliently flexible to receive and retain the fastener means in preassembled relation to said fitting in response to axial movement of the fastener means relative to said retaining means and said aperture prior to securing said fitting to the support structure.

27. A remote control assembly comprising a conduit, a fitting secured to said conduit for mounting the latter to a support structure, said fitting including means defining an aperture extending therethrough to receive a male threaded fastener means, and an axially resiliently flexible retaining means secured to said fitting in substantial axial alignment with said aperture therein, said retaining means being axially resiliently flexible to receive and retain the fastener means in preassembled relation to said fitting in response to solely axial movement of the fastener means relative to said retaining means and said aperture prior to securing said fitting to the support structure.

28. The invention as defined in claim 27 wherein said fitting is made of plastic, and said retaining means is formed integrally therewith.

29. The invention as defined in claim 27 in which said retaining means is disposed within said aperture.

30. The invention as defined in claim 29 wherein said retaining means comprises an annularly endless membranous rib.

31. The invention as defined in claim 30 wherein said fitting is made of plastic, and said rib is formed integrally therewith.

32. The invention as defined in claim 27 further including a male threaded fastener means retained in preassembled relation in said retaining means and aperture.

References Cited by the Examiner

UNITED STATES PATENTS

| | | | |
|---|---|---|---|
| 2,274,014 | 2/1942 | Tinnerman | 151—41.75 X |
| 2,477,178 | 7/1949 | Hallock | 24—221 |
| 2,871,718 | 2/1959 | Schroeder | 74—501 |
| 2,901,200 | 8/1959 | Voecks | 248—74 |
| 2,936,982 | 5/1960 | Cushenberry | 248—74 |

FOREIGN PATENTS

| | | |
|---|---|---|
| 756,094 | 8/1956 | Great Britain. |
| 790,819 | 2/1958 | Great Britain. |

CLAUDE A. LE ROY, *Primary Examiner.*